Figure 1:
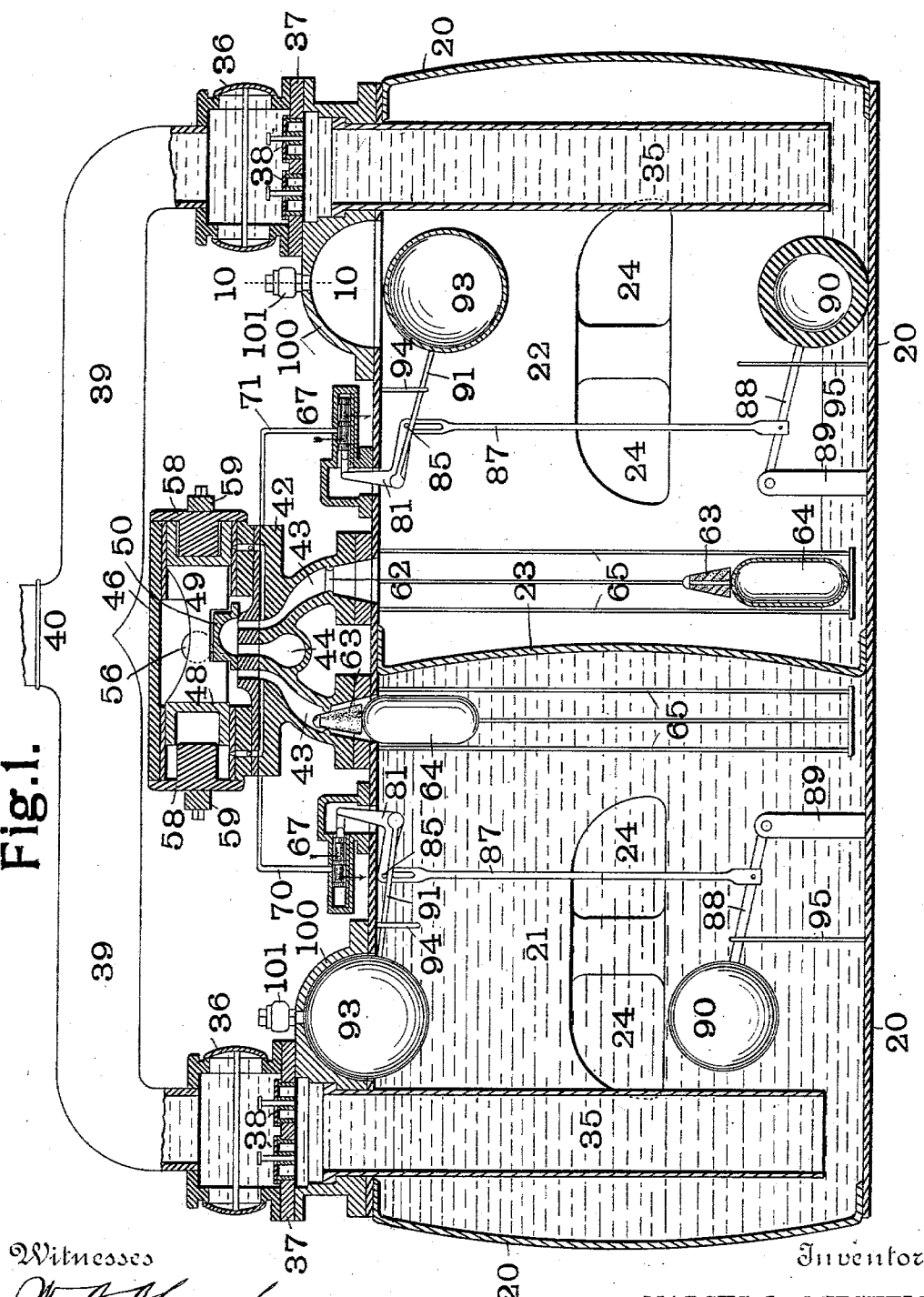

No. 629,867. Patented Aug. 1, 1899.
M. L. MITCHELL.
COMPRESSED AIR PUMP.
(Application filed Jan. 28, 1899.)
(No Model.) 5 Sheets—Sheet 1.

Witnesses
W. H. Alexander.
Fred Gray.

Inventor
MARCUS L. MITCHELL.
By Attorneys
Fowler & Fowler

THE NORRIS PETERS CO., PHOTO-LITHO., WASHINGTON, D. C.

No. 629,867. Patented Aug. 1, 1899.
M. L. MITCHELL.
COMPRESSED AIR PUMP.
(Application filed Jan. 28, 1899.)
(No Model.) 5 Sheets—Sheet 2.
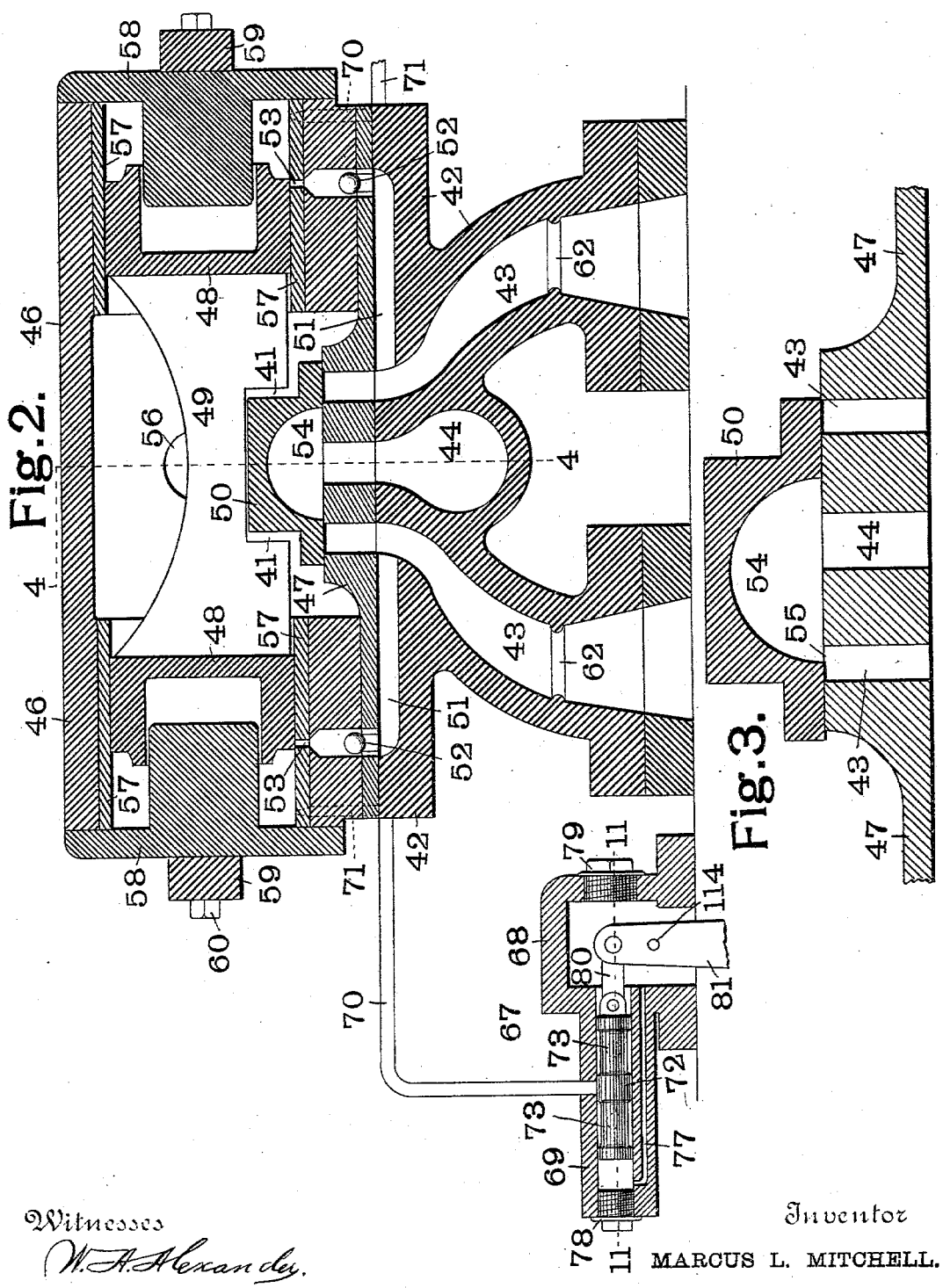
Witnesses
W. H. Alexander.
Fred Gray
Inventor
MARCUS L. MITCHELL.
By Attorneys
Fowler & Fowler No. 629,867. Patented Aug. 1, 1899.
M. L. MITCHELL.
COMPRESSED AIR PUMP.
(Application filed Jan. 28, 1899.)
(No Model.) 5 Sheets—Sheet 3.
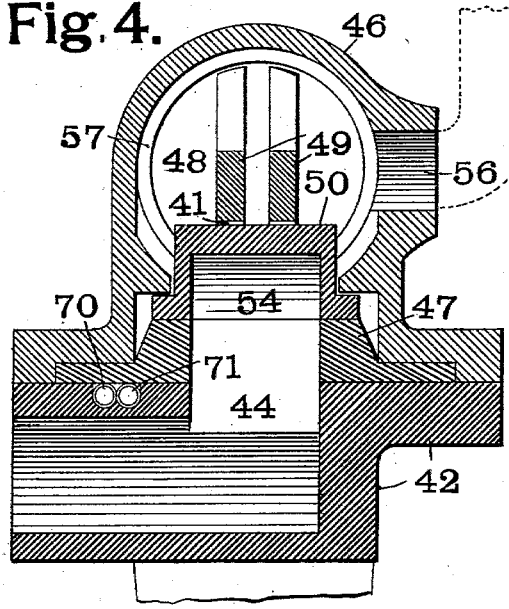
Fig. 4.
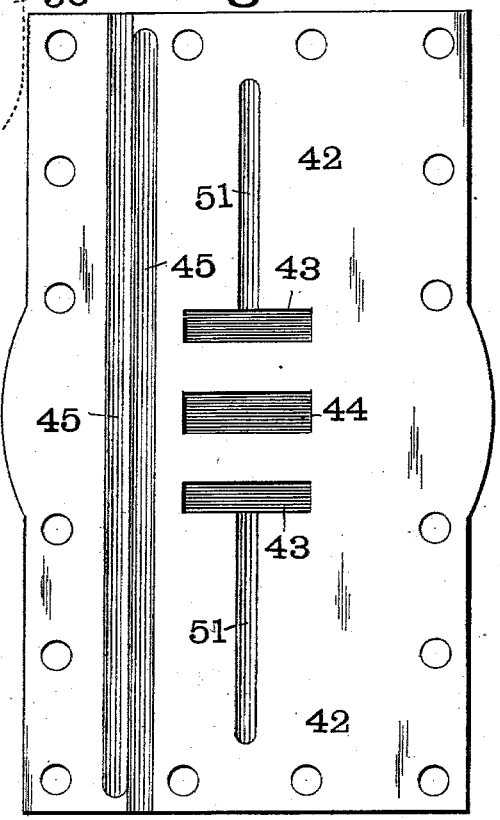
Fig. 5.
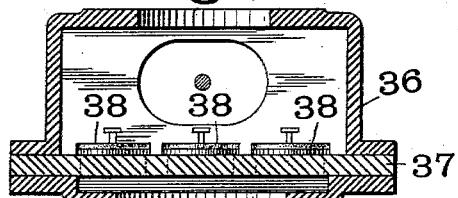
Fig. 6.
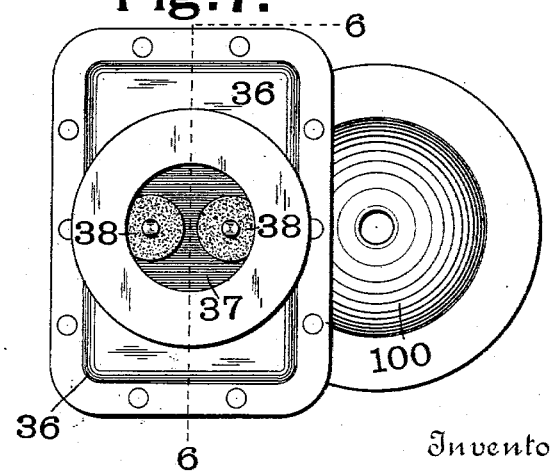
Fig. 7.
Fig. 8.
Witnesses
W. H. Alexander,
Fred Gray.
Inventor
MARCUS L. MITCHELL.
By Attorneys
Fowler & Fowler
THE NORRIS PETERS CO., PHOTO-LITHO., WASHINGTON, D. C.

No. 629,867. Patented Aug. 1, 1899.
M. L. MITCHELL.
COMPRESSED AIR PUMP.
(Application filed Jan. 28, 1899.)
(No Model.) 5 Sheets—Sheet 4.
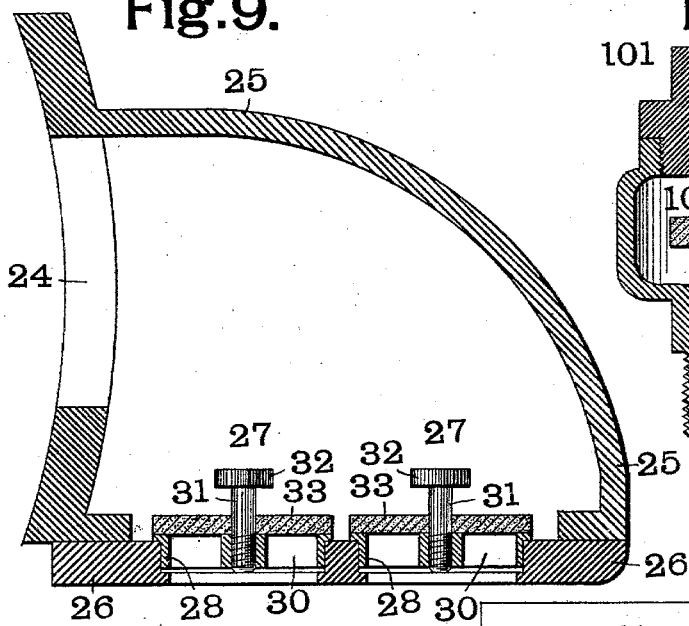
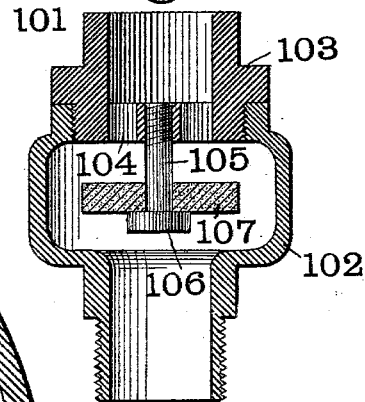
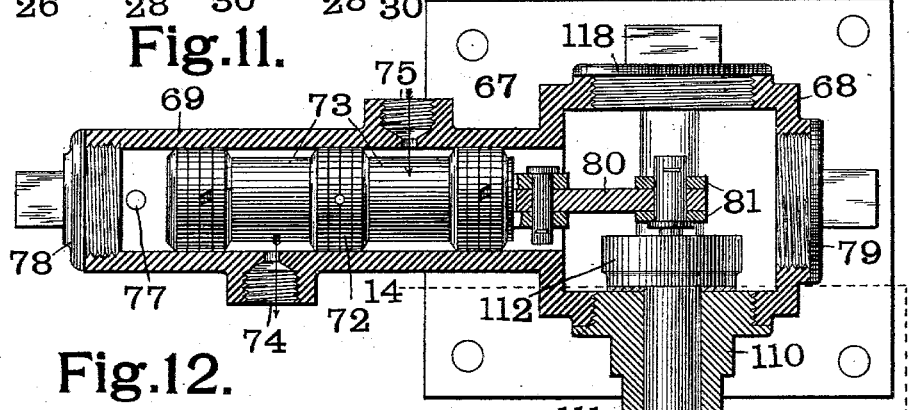
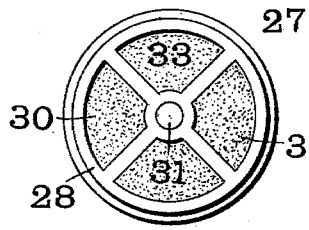
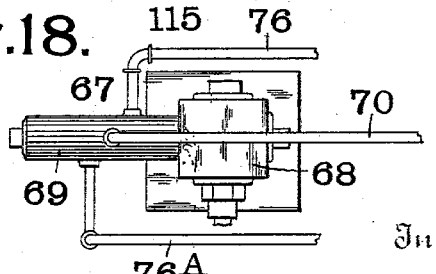
Witnesses
W. H. Alexander.
Fred Gray.
Inventor
MARCUS L. MITCHELL.
By Attorneys
Fowler & Fowler
THE NORRIS PETERS CO., PHOTO-LITHO., WASHINGTON, D. C.

No. 629,867. Patented Aug. 1, 1899.
M. L. MITCHELL.
COMPRESSED AIR PUMP.
(Application filed Jan. 28, 1899.)
(No Model.) 5 Sheets—Sheet 5.

Witnesses
W. H. Alexander,
Fred Gray.

Inventor
MARCUS L. MITCHELL.
By Attorneys
Fowler & Fowler

THE NORRIS PETERS CO., PHOTO-LITHO., WASHINGTON, D. C.

UNITED STATES PATENT OFFICE.

MARCUS L. MITCHELL, OF ST. LOUIS, MISSOURI.

COMPRESSED-AIR PUMP.

SPECIFICATION forming part of Letters Patent No. 629,867, dated August 1, 1899.

Application filed January 28, 1899. Serial No. 703,691. (No model.)

*To all whom it may concern:*

Be it known that I, MARCUS L. MITCHELL, a citizen of the United States of America, residing at St. Louis, in the State of Missouri, have invented a certain new and useful Compressed-Air Pump, of which the following is such a full, clear, and exact description as will enable any one skilled in the art to which it appertains to make and use the same, reference being had to the accompanying drawings, forming part of this specification.

My invention relates to that class of pumps in which the water is first allowed to enter a suitable chamber through a valved inlet and then is forced out by the admission of compressed air to said chamber.

My pump is especially adapted to be used with two chambers, so that the water is forced out of one while it is entering the other, thus giving a continuous or practically continuous flow. Many features of my invention, however, are applicable to pumps having but a single chamber. Pumps of this class are usually submerged in the water, so that the water enters them by gravity.

My invention consists in so arranging the main valve that the admission of air can be cut off from one chamber before the exhaust is cut off from the other chamber, so as to prevent waste of air and also to allow the said latter chamber to be completely filled with water before the compressed air is admitted to it.

My invention also consists in various other novel features and details of construction, all of which will be described in the following specification and pointed out in the claims affixed hereto.

Figure 13:
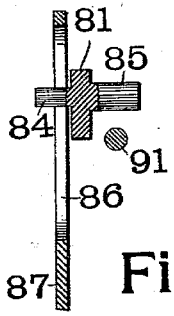
Figure 14:
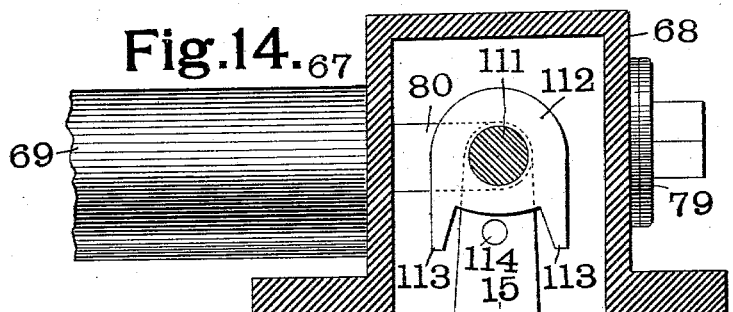
Figure 15:
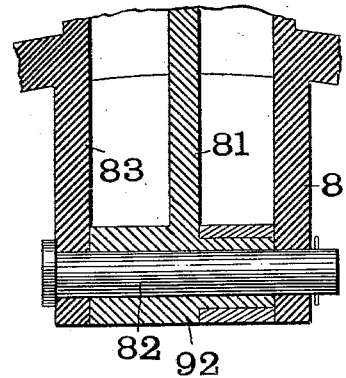
Figure 17:
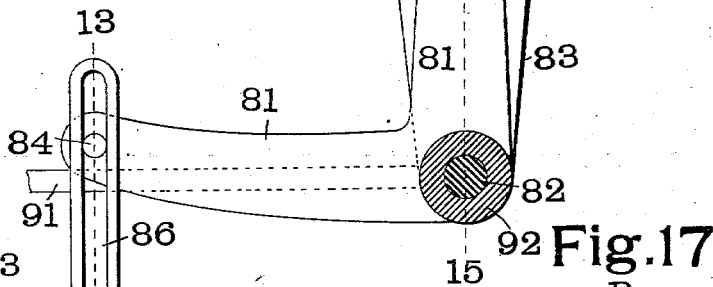
Figure 16:
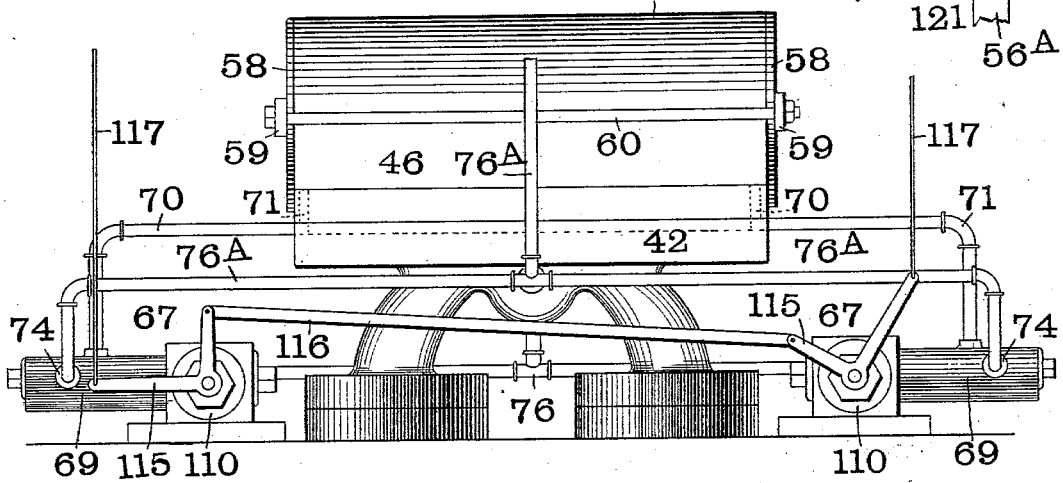

In the accompanying drawings, which illustrate one form of pump made in accordance with my invention, Figure 1 is a vertical longitudinal central section. Fig. 2 is an enlarged view of a portion of the valve mechanism shown in Fig. 1. Fig. 3 is an enlarged view of the main valve shown in Fig. 2, but in a different position. Fig. 4 is a section on the line 4 4 of Fig. 2. Fig. 5 is a top plan view of one of the parts shown in Figs. 2 and 4. Fig. 6 is a section on the line 6 6 of Fig. 7. Fig. 7 is a top plan view of one of the discharge-valve casings. Fig. 8 is a top plan view of one of the plates carrying the discharge-valves. Fig. 9 is a vertical cross-section of one of the inlet-valve casings. Fig. 10 is a section on the line 10 10 of Fig. 1. Fig. 11 is an enlarged section on the line 11 11 of Fig. 2. Fig. 12 is a bottom plan view of one of the inlet-valves. Fig. 13 is a section on the line 13 13 of Fig. 14. Fig. 14 is a section on the line 14 14 of Fig. 11. Fig. 15 is a section on the line 15 15 of Fig. 14. Fig. 16 is an elevation of the controlling-valve mechanism. Fig. 17 is a view showing some of the pipe connections, and Fig. 18, Sheet 4, is a top plan view of one of the valves shown in Fig. 16.

Like marks of reference refer to similar parts in the several views of the drawings.

20 represents a cylinder which is divided into two chambers 21 and 22 by a partition 23. Each of the chambers 21 and 22 is provided with inlet-openings 24. Secured around the inlet-openings 24 of each of the chambers is an inlet-valve casing 25. (Shown in detail in Fig. 9.) Secured to the bottom of the casing 25 is a plate 26, which carries the inlet-valves 27. Each of the valves 27 consists of a suitable metal disk 28, which is adapted to fit tightly in a suitable opening in the plate 26 and is provided with openings 30. Secured in the center of the disk 28 is a rod 31, at the upper end of which is a head 32. Sliding on the rod 31 is a disk 33, of rubber or other suitable material, which is adapted to close the openings 30. The head 32 limits the upward movement of the disk 33. I prefer to use a number of these valves 27 in place of one large valve, as the necessary amount of water can thus be admitted with less movement of the valve, so that the valve acts more quickly and also causes less jar in seating.

Extending upward from near the bottom of each of the chambers 21 and 22 is a pipe 35, Fig. 1, which communicates with a discharge-valve casing 36. Contained in the discharge-valve casing 36 is a plate 37, which carries a number of discharge-valves 38. The discharge-valves 38 are constructed like the inlet-valves 27, previously described, and hence it is not necessary to describe their construction in detail. I use a number of them for the reasons given in connection with the valves 27. Leading from each of the discharge-valve casings 36 is a pipe 39. The two pipes 39 may be connected to a common pipe 40, which is then led to the point where it is desired to discharge the water.

Secured to the cylinder 20 is a casting 42, which is provided with two ports 43, one of which communicates with each of the chambers 21 and 22 and alternately serves as a supply and a discharge port for the compressed air. The casting 42 is also provided with an exhaust-port 44, which is alternately connected first with one and then the other of the two ports 43. The casting 42 has also formed in it two grooves 45, Fig. 5, for the reception of air-pipes to be hereinafter described. Secured to the casting 42 is a main-valve casing 46, Figs. 1, 2, 4, and 16, and between the said parts is held a valve-plate 47. Sliding in the valve-casing 46 is a piston 48. The central portion of the piston 48 is composed of two webs 49, Fig. 4, which webs have formed in their under edges recesses 41 for the reception of a slide-valve 50, which controls the ports 43 and 44, which are continued upwardly through the valve-plate 47. The recesses 41 are of such a length that the valve 50 will have some play, and hence will not have as much movement as the piston 48. Each end of the valve-casing 46 communicates by way of an auxiliary port or by-pass 51 with one of the ports 43, and in each of the auxiliary ports 51 is placed a valve 52, preferably in the form of a small rubber ball which seats upwardly and closes the contracted passage 53, which connects the ends of the casing with the ports 51.

The slide-valve 50 should be formed, as shown in Fig. 3, so that it will close the port 43 which has been in communication with the live air before the other port 43 is cut off from the exhaust. This is best done, as is shown in Fig. 3, by having the opening 54 in the slide-valve 50 of such length that when one of the ports 43 is closed an opening 55 will be left connecting the other port 43 with the exhaust-port 44. Compressed air is admitted to the central portion of the valve-casing 46 through an opening 56. (Shown in Figs. 2 and 4.) This opening is connected with a suitable supply-pipe 56$^A$, which leads either directly or indirectly to the air compressor or reservoir for furnishing the compressed air.

The piston 48 should be of such a length that when it is in its central position, as shown in Fig. 2, it will cover both the contracted passages 53, leading to the ports 51. I prefer to line the ends of the valve-casing 46 with cylinders 57, of bronze, brass, or other suitable material which is not easily affected by water. The ends of the valve-casing 46 are closed by heads 58, which may be held in position by cross-bars 59 and bolts 60, Figs. 2 and 16, or any other suitable means.

Formed in each of the ports 43, preferably some distance above the top of the cylinder 20, are valve-seats 62, Figs. 1 and 2. 63, Fig. 1, are conical valves, of rubber or other suitable material, which are adapted to seat against the valve-seats 62. Each of these valves 63 is carried by a float 64, preferably made of hollow metal. The floats 64 are guided in their upward-and-downward movement by suitable rods 65. The rods 65 should extend to near the bottom of the cylinder 20, so as to allow the valves 63 to be at such a distance from their seats that there will be no danger of the outgoing air seating them when the air is exhausted. The object of the valves 63 is to prevent the water from passing up through one of the ports 43 into the exhaust-pipe in case the chamber connected with the exhaust should become filled before the other chamber was emptied.

Secured to the cylinder 20 are two primary valves 67, one of which communicates with the chamber 21 and the other with chamber 22. Each of these valves 67 consists of a box or chest 68, Figs. 2, 11, and 14, from which projects a suitable cylinder 69. Leading from the cylinder 69 of the valve 67 which is in communication with the chamber 21 is a pipe 70, (see also Figs. 1, 4, and 16,) which communicates with the opposite end of the main-valve chamber 46, and leading from the cylinder 69 of the other valve 67 to the other end of the main-valve chamber 46 is a similar pipe 71. The pipes 70 and 71 lie in the grooves 45 in the plate 42, Figs. 4 and 5. In each of the cylinders 69 is a piston 72, which has formed in it two reduced portions 73, Figs. 2 and 11. In each of the cylinders 69, at the outer side of the pipes 70 and 71, respectively, is formed an exhaust-port 74 and at the inner side of said pipes a supply-port 75. Each of these ports 74 and 75 is adapted to be alternately connected with one of the pipes 70 or 71 by the movement of the piston 72. 76, Figs. 16, 17, and 18, is an air-supply pipe having two lateral branches which communicate with the ports 75. The exhaust-ports 74 are preferably connected with an exhaust-pipe 76$^A$. Connecting the outer end of the cylinder 69 with the box or chest 68 is a suitable port 77, Fig. 2. The object of this port 77 is to balance the piston 72, so that the pressure from the chambers 21 and 22 will not affect the movement of said piston. The end of each of the cylinders 69 is preferably supplied with a screw-plug 78 to admit of the removal of the piston 72, and the box or casing 68 is also preferably supplied with a screw-plug 79 to give access to the interior thereof. Each of the pistons 72 is connected, by means of a link 80, with one end of a bell-crank lever 81, Figs. 1, 2, 11, and 14, which projects upwardly into the interior of the box 68. The bell-crank lever 81 is pivoted, by means of a pin 82, Figs. 14 and 15, between two downwardly-projecting arms 83, carried by the box 68. The lower end of the bell-crank lever 81 is provided with two studs or pins 84 and 85, Fig. 13. The pin 84 is adapted to work in a slot 86, formed in the upper end of a rod 87, the lower end of which is pivoted to a bar 88, Fig. 1, one end of which is pivoted to an upright 89 and the other of which is attached to a weight 90. The stud or pin 85 is adapted to come in contact with a rod 91, one end of which turns loosely on the hub 92 of the bell-crank lever 81 and the other end of which is attached to a float 93. The weights 90 are in the form of floats, but have only sufficient buoyancy to sustain their own weight, so as not to counteract the effect of the floats 93.

Depending from the top of the cylinder 20 are two stops 94, which limit the downward movement of the floats 93, and two similar stops 95, projecting upwardly from the bottom of the cylinder 20, limit the upward movement of the weights 90. In order to economize space, I provide domes 100, into which the floats 93 project when in their highest position. These domes 100 are preferably formed integral with the lower parts of the discharge-valve casings 36. By the use of the domes 100 the chambers 21 and 22 are allowed to become completely filled with water, so that no air is wasted in filling an air-space with air at pumping pressure. In order to allow for the escape of the air from the domes 100 after they have become water-sealed from the discharge-ports, I provide them with valves 101. (Shown in detail in Fig. 10.) Each of the valves 101 consists of a lower or main part 102 and an upper part or screw-cap 103. In the cap 103 are formed a number of openings 104, arranged around a central opening in which is secured a rod 105, provided with a head 106. Sliding on the rod 105 is a disk 107, of rubber or other suitable material. While the chambers are filling, the air passes upwardly around the disk 107 and through the openings 104 without disturbing the said disk. When the compressed air is admitted to the chamber at pumping pressure, however, the force is sufficient to raise the disk 107 against the lower face of the cap 103 and close the openings 104.

The primary valves 97 are operated automatically by the floats 93 and weights 90 in a manner to be hereinafter described. It is sometimes desirable, however, to operate these valves manually. This is done by devices which will now be described. On one side of the box or case 68 of each of the primary valves is secured a screw-plug 110, Fig. 11, through which passes a rock-shaft 111. Secured to or formed integral with the inner end of the rock-shaft 111 is an enlarged portion 112, which is provided with two arms 113. The arms 113, Fig. 14, embrace a pin 114, which is secured to the bell-crank lever 81. The arms 113 are such a distance apart as to allow the bell-crank lever 81 to perform its usual travel without causing the pin 114 to come in contact with the said arms. Secured to the outer end of the rock-shaft 111 is a bell-crank lever 115. The two adjacent arms of the bell-crank levers 115 are connected by a rod or link 116, Fig. 16, and the outer arms of the said levers have attached to them suitable wires or rods 117, which extend upwardly, so that they can be manually operated. The side of the box or casing 68 opposite to that containing the screw-plug 110 is preferably provided with a screw-plug 118, Fig. 11, to give access to the interior of the said casing 68.

120, Fig. 17, represents the reservoir of the air-compressor, which supplies the air for operating the pump. The pipe $56^A$, leading to the main valve 46, is connected with a pipe $56^B$, which communicates with the reservoir 120, and between the pipes $56^A$ and $56^B$ is a throttle-valve 121, by means of which the supply of air through the pipe $56^A$ to the valve-casing 46 may be diminished or, if desired, completely shut off. The valve 121 may be operated by means of a hand-wheel 122 or by any other suitable means. The valve 121 should be placed at a point within access of the operator and may be placed near the reservoir 120, as shown in the drawings, or at any desired distance from said reservoir, provided access may be had to it. The supply-pipe 76, leading to the primary valves 67, is connected with the pipe $56^B$, between the reservoir 120 and the valve 121, so that the operation of the valve 121 will not in any way affect the supply of air passing through the pipe 76, or, if so desired, the pipe 76 may be connected to the reservoir 120 independently of the pipe $56^B$, as the same result may be obtained in this manner. The rate of discharge of the pump is regulated by the valve 121, as the farther this valve is opened the greater will be the pressure in the pipe $56^A$, and consequently the more rapid the discharge of the pump. In practice the valve 121 is rarely, if ever, completely opened, as it is desirable to have the pressure in the reservoir somewhat higher than that required for pumping. It follows from this that the pressure in the pipe 76 is higher than that in the pipe $56^A$. This, for reasons which will be hereinafter explained, is an important feature in obtaining some of the objects of my invention.

The operation of my pump is as follows: Supposing the parts to be in the position shown in Fig. 1 and the chamber 21 full of water and the chamber 22 empty, the compressed air, passing down the pipe $56^A$ to the valve-casing 46, enters the chamber 21 through the port 43, driving the float-valve 63 downward as it enters. This will force the water contained in the chamber 21 up through the pipe 35, valves 38, and connecting-pipe 39 to the discharge-pipe 40. At the same time the port 43, leading to the chamber 22, being opened through the valve 50 to the exhaust-port 44, the air contained in the said chamber 22 will pass out through said ports and allow the water surrounding the pump to enter the chamber 22 through the inlet-valves 27 and openings 24. As the water falls in the chamber 21 the float 93 will fall with it until detained by means of the stop 94. As the rod 91 of the float 93 is below the pin 85 of the bell-crank lever 81, the downward motion of said float 93 in the chamber 21 will not in any way affect the said bell-crank lever, and as the water rises in the chamber 22 the weight 90 in said chamber will rise with it until prevented by the stop 95. The slot 86 in the upper end of the rod 87 will allow the weight 90 to rise without affecting the bell-crank lever 81 of the primary valve 67 connected with the chamber 22. When the water in the chamber 21 has fallen to near the end of the pipe 35, the weight 90 will descend with it and by means of the rod 87 will pull the end of the bell-crank lever 81 downward and force the piston 72 of the valve 67 outwardly, thus connecting the air-pipe 70 with the air-supply pipe 76. The air will now pass from the supply-pipe 76 through the pipe 70 into the right-hand end of the main valve 46. As the left-hand end of the main-valve casing 46 is in communication through the ports 51 and 43 with the chamber 21, which contains air at pumping pressure, which pressure, as has been hereinbefore explained, is less than that supplied by the pipe 76, the piston 48 will be forced toward the left-hand end of the valve 46 until the left-hand port 43 is closed. At the same time the end of the piston 48 will close the left-hand port 51 and shut off communication between that end of the valve-casing 46 and the chamber 21. The pressure will then immediately rise in this end of the valve-casing until equal to that in the opposite end, as both are now in communication with the air-supply pipe 76. This will hold the piston 48 and valve 50 in this position until the chamber 22 is completely filled with water, the valve 50 being in a reversed position to that shown in Fig. 3, so that the right-hand port 43 will still be in communication with the exhaust 44. As soon as the chamber 22 is completely filled the float 93 at that end will be forced upward into the dome 100 and by means of the pin 85 will force upwardly the end of the bell-crank lever 81, thus drawing the piston 72 of the valve 67 inwardly and connecting a pipe 71 with the exhaust 76ᴬ, thus exhausting the air from the left-hand end of the valve-casing 46. This will immediately cause the piston 48 to move farther toward the left until the right-hand port 51 is put into communication with the right-hand end of the valve-casing 46. The compressed air will now pass down through the port 51 into the port 43 and gradually fill the same up to the pumping pressure without causing any jar or shock on account of the contracted opening 53. As the opening 53, however, is larger than the supply-opening, the valve will remain in this position until the air in port 43 is raised to practically working pressure, when it will force the piston 48 completely to the left, thus connecting the right-hand port 43 with the air-supply and the left-hand port 43 with the exhaust. The above operation will then be reversed, the water being forced out of the chamber 22 and allowed to enter the chamber 21. It will be seen by reference to Fig. 2 that the above-described operation could not be properly performed if there were no play between the piston 48 and valve 50, for if the valve 50 were rigidly secured to the piston the port 43 would be opened at practically the same time as the port 51. It is to be understood, however, that in the operation of the pump the parts are never in the position shown in Fig. 2, for when the piston 48 is in the position shown in Fig. 2 the valve 50 is either in the position shown in Fig. 3 or in the reversed position, and when the valve is in the position shown in Fig. 2 the piston will be in such a position as to uncover one of the ports 51.

In the above operation if the chamber 22 had become filled with water before the chamber 21 had become emptied the operation would be the same, except that the piston 48 would make but a single stop in its travel, for when the chamber 22 became filled and by raising the float 93 connected the left-hand end of the valve 46 with the exhaust there would be no movement of the piston 48, as the right-hand end of the said valve would also be connected with the exhaust, so that when the chamber 21 was emptied and connected the right-hand end of the valve 46 with the air-supply the said valve would move over until it uncovered the right-hand port 51 and allowed the compressed air to pass down the same. In this case the valve 52 in the left-hand port 51 would be forced upwardly to close the opening 53, leading from said port to the left-hand end of the valve 46, and thus prevent the said end from being filled with air at the pumping pressure, or otherwise the operation of the pump would be delayed until enough air was exhausted from the chamber 21 to reduce the pressure considerably below the pumping pressure.

In case the piston 48 became clogged by sediment during a period of disuse it might be found that the pump would not operate when the compressed air was turned on. In this case the air would first be completely closed from the supply-pipe 56ᴬ by means of the throttle-valve 121. This, as previously described, would not interfere with the supply of air through the pipe 76 to the primary valves 67. These valves could now be operated by alternately pulling upwardly on the two wires 117. This would throw the air-pressure first on one and then the other end of the piston 48 until the same became loosened, when the air could be turned on the supply-pipe 56ᴬ, so that the pump could proceed to operate automatically.

In an application, Serial No. 678,462, filed by me April 22, 1898, I have claimed the combination, with two valved chambers, of a main valve for controlling the admission of air to and exhaust thereof from said chambers and means for alternately and independently connecting each end of said main valve with the air supply and exhaust by the rise and fall of the liquid in said chambers. In said application I have also claimed the combination, with a chamber for containing liquid to be raised, of an air-supply, a valve controlling the admission of air from said air-supply to said chamber through a main port, a secondary port, and means for opening said latter-named port by the initial movement of said valve. In said application I have also claimed the combination, with a chamber for containing the liquid to be raised, of a main air-supply, a main valve controlling said air-supply, a separate and independently-controllable air-supply for operating said main valve, an auxiliary valve to control said air-supply, mechanism for automatically operating said auxiliary valve, and means for manually operating said auxiliary valve when said main air-supply is cut off.

Having now fully described my invention, what I claim is—

1. In a compressed-air water-elevator, two chambers each provided with a valved inlet and a valved discharge, two main air-ports, one communicating with each chamber, a suitable air-supply adapted to be put in communication with said main air-ports, an exhaust-port also adapted to be put in communication with said main air-ports, a valve for closing off the main air-port in communication with an emptied chamber from both the air-supply and the exhaust while the main air-port of the filling-chamber is in communication with the exhaust, and means for maintaining said latter communication until said latter chamber is filled.

2. In a compressed-air water-elevator, two chambers each provided with a valved inlet and a valved discharge, two main air-ports, one communicating with each chamber, a suitable air-supply adapted to be put in communication with said main air-ports, an exhaust-port also adapted to be put in communication with said main air-ports, a valve arranged to close off the main air-port of the emptied chamber from both the air-supply and the exhaust while the main air-port of the filling-chamber is in communication with the exhaust, and means for retaining said valve in said position until said latter chamber is filled.

3. In a compressed-air water-elevator, two chambers, each provided with a valved inlet and a valved discharge, two main air-ports, one communicating with each chamber, an air-supply, an exhaust, a valve adapted to alternately connect each of said main air-ports with the air-supply and with the exhaust, secondary air-ports for supplying air to said chambers to raise the pressure in the same, a piston controlling said secondary ports, and means for actuating said valve by the movement of said piston to move said valve a less distance than said piston.

4. In a compressed-air water-elevator, two chambers, each provided with a valved inlet and a valved delivery, two main air-ports, one communicating with each chamber, an air-supply, an exhaust, secondary air-ports for supplying air to said chambers to raise the pressure in the same, a piston acting as a valve for said secondary ports, a valve for said main ports, and loose connections between said valve and said piston, whereby said piston will move a greater distance than said valve.

5. In a compressed-air water-elevator, two chambers each provided with a valved inlet and a valved discharge, two main air-ports, one communicating with each chamber, a main air-supply adapted to furnish compressed air to said main air-ports, a suitable valve controlling the admission of air to said main ports, a piston for actuating said valve, a secondary air-supply adapted to supply air at a higher pressure than said main air-supply for moving said piston, passage-ways between said secondary air-supply and said main ports, and means for closing said latter-named passage-ways while one of said main ports is cut off from the main air-supply and the other of said main ports is in communication with the exhaust.

In testimony whereof I have hereunto set my hand and affixed my seal in the presence of the two subscribing witnesses.

MARCUS L. MITCHELL. [L. S.]

Witnesses:
W. A. ALEXANDER,
A. C. FOWLER.